(No Model.)

J. CHRISTIANSEN, A. BURNHAM & J. A. DUGGAN.
MOTOR, LOCOMOTIVE, OR CAR WHEEL.

No. 563,447. Patented July 7, 1896.

WITNESSES:
John L. McLean
E. A. Soper

INVENTORS:
John Christiansen
Arthur Burnham
John A. Duggan
by Chas. H. Drew
their attorney.

UNITED STATES PATENT OFFICE.

JOHN CHRISTIANSEN, OF QUINCY, ARTHUR BURNHAM, OF BOSTON, AND JOHN A. DUGGAN, OF QUINCY, MASSACHUSETTS.

MOTOR, LOCOMOTIVE, OR CAR WHEEL.

SPECIFICATION forming part of Letters Patent No. 563,447, dated July 7, 1896.

Application filed January 9, 1891. Serial No. 377,193. (No model.)

*To all whom it may concern:*

Be it known that we, JOHN CHRISTIANSEN, of Quincy, in the county of Norfolk, ARTHUR BURNHAM, of Boston, in the county of Suffolk, and JOHN A. DUGGAN, of Quincy, in the county of Norfolk, State of Massachusetts, have invented certain Improvements in Motor, Locomotive, and Car Wheels, of which the following is a specification.

The object of our invention is to provide locomotives, electric car, and other motors with wheels so constructed that the tendency to slip upon the surface, or to lose contact with the rail, because of the accumulation of snow, ice, dirt, or dust in the flange-path and the space adjoining the same, will be much reduced, if not entirely prevented.

It will be found in practice that when the flange-path of ordinary wheels is obstructed, especially by snow or ice, the wheels upon electric cars will cease to rotate if the contact between the wheel and rail is broken, or if the contact be partially lost the wheel will rotate upon the ice or snow without moving ahead. With the wheels herein described, provided with a serrated and roughened flange, and an auxiliary thread also serrated or roughened, the wheel will either cut away the obstructions in the flange-path, thus giving the usual contact between the wheel and rail, or because of the increased friction between the roughened periphery of the wheels and the obstruction the wheel will be prevented from slipping, thus keeping the car in motion, although the wheel-tread is not in actual contact with the rail, the electrical contact and complete circuit required to work the motor being retained by the separate contact wheel and bar, which bears at all times upon the rail.

Wheel-treads, particularly motor-wheel treads, deteriorate very rapidly, in consequence of the slipping of the wheels in starting, ascending grades, or moving upon slippery tracks.

With the wheels constructed as described, the wear of the tread will be much lessened, and the mileage increased, as the wheels will slip less frequently because of the increased traction, due to the additional friction between the auxiliary tread and the flange-surface upon which it bears.

It will be seen that our wheel is a supporting-wheel adapted for use both when there is, and when there is not, snow and ice on the tracks, on which the motor, car, or locomotive, provided with the wheels, is in use.

Figures 1, 2:
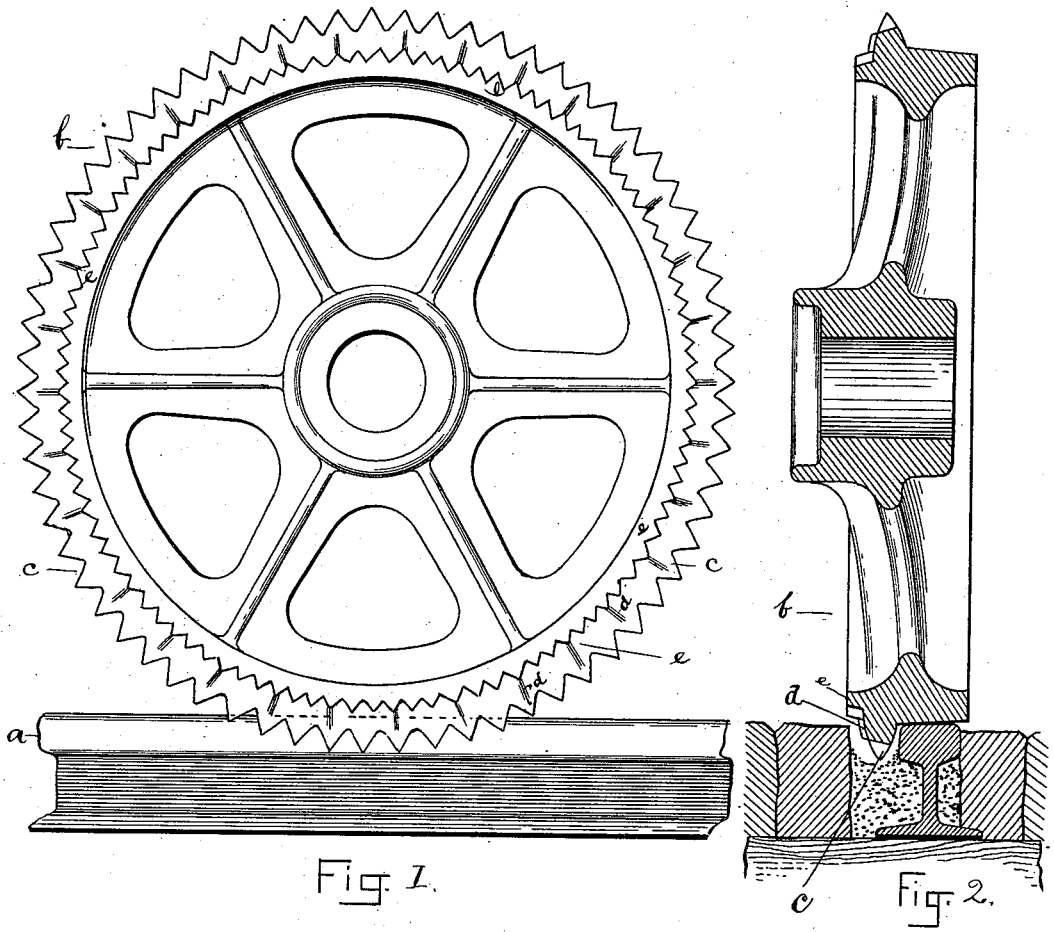
Figure 3:
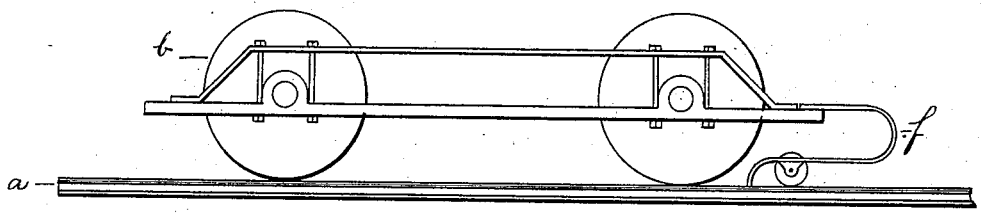

In the drawings, we have shown, in Figure 1, a side view of a wheel embodying our invention; in Fig. 2, a section of a rail and the rim of a wheel, having thereon a serrated or roughened flange, and ribs on periphery or side of same, and auxiliary tread having a serrated or roughened surface. $a$ is the rail. $b$ is the wheel; $c$, the flange, $d\ d$ ribs, and $e$ the auxiliary tread; and in Fig. 3 we have shown a longitudinal section of the lower part of a car, with wheels and separate contact wheel and bar $f$ attached thereto.

What we claim, and desire to secure by Letters Patent, is—

A locomotive, car, or motor wheel having serrated flanges, the bottom of the notch or "serration" being on a line obliquely upward from the inner line of the flange toward a point intermediate between the wheels, substantially as shown.

JOHN CHRISTIANSEN.
ARTHUR BURNHAM.
JOHN A. DUGGAN.

Witnesses:
CHAS. H. DREW,
ANSON M. LYMAN.